J. M. TAGGART.
MIXING AND CONVEYING APPARATUS.
APPLICATION FILED APR. 13, 1918.

1,295,814.  
Patented Feb. 25, 1919.  
2 SHEETS—SHEET 1.

Witnesses  
J. H. Crawford  
F. Hough

Inventor  
J. M. Taggart,  
By Victor J. Evans  
Attorney

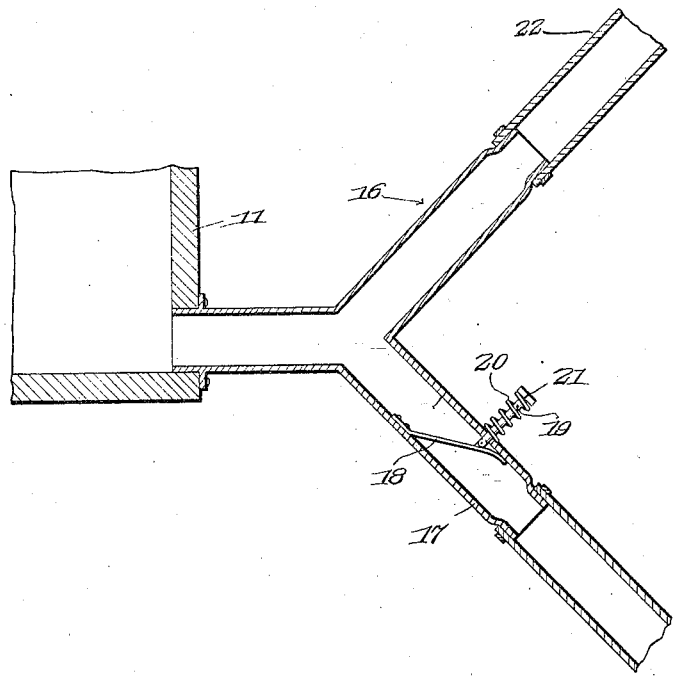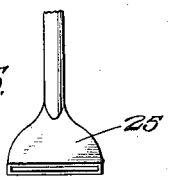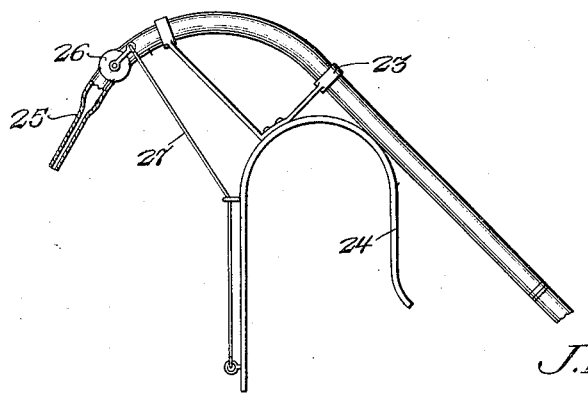

UNITED STATES PATENT OFFICE.

JOHN MONTGOMERY TAGGART, OF SPRINGFIELD, OHIO.

MIXING AND CONVEYING APPARATUS.

1,295,814.     Specification of Letters Patent.     Patented Feb. 25, 1919.

Application filed April 13, 1918. Serial No. 228,437.

*To all whom it may concern:*

Be it known that I, JOHN M. TAGGART, citizen of the United States, residing at Springfield, in the county of Clark and State of Ohio, have invented new and useful Improvements in Mixing and Conveying Apparatus, of which the following is a specification.

This invention relates to a conveying apparatus which may be employed during erection of a structure to obviate the necessity of transporting in hods and wheelbarrows material such as mortar, plaster and the like, from the chamber in which it is mixed to a point adjacent the surface to which the material is to be applied.

The primary object of the invention is to provide a conveying apparatus of this character wherein a mixture is provided with conveying means intended to be attached to the shoulder of an artisan and supplied adjacent its point of attachment with a valve which may be operated by the mechanic to permit the mixed material to be discharged directly upon the implement by means of which the material is to be applied, or direct into an overflow pipe comprising a part of the conveying means and discharging either into the mixer, or into a receptacle upon which the mixer is mounted.

Another object of the invention is to provide the conveying means comprising a part of the conveying apparatus with a valve which is arranged adjacent the receiving end of the overflow pipe and so constructed that when the flow of material through the discharge end of the conveying means is interrupted the valve will be automatically opened by the pressure of the material being discharged into the conveying means to permit such material to flow through the overflow pipe.

A further object of the invention is to so construct the conveying portion of the apparatus that the mixed material therein may be forced from the discharge end of the conveying portion or through the overflow pipe associated therewith by the discharge of material from the mixer.

With these and other objects in view the invention resides in the novel combination and arrangement of parts which will be hereinafter described and particularly pointed out in the claims.

In the drawings:

Fig. 3 is an enlarged detail sectional view through the receiving end of the conveying portion of the apparatus.

Fig. 4 is an enlarged view in side elevation partly in section of the discharge end of the conveying portion of the apparatus and the attaching plate associated therewith.

Fig. 5 is a detail view of the discharge nozzle.

Like characters of reference denote the corresponding parts throughout the several views in the drawings.

Figure 1:
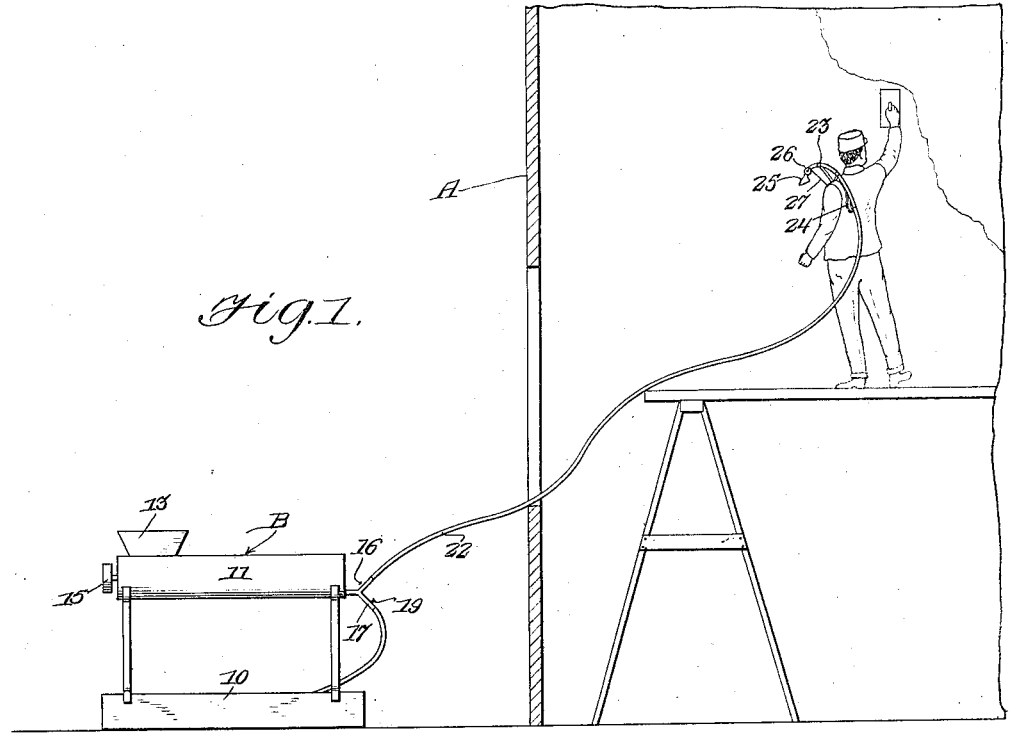
Figure 1 is a sectional view through a portion of a structure into which material is being conveyed by a conveying apparatus constructed in accordance with the invention.
Figure 2:
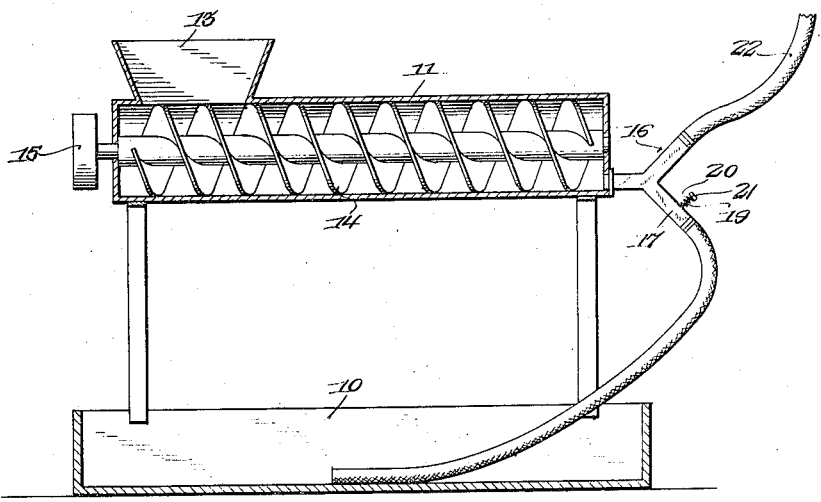
Fig. 2 is an enlarged sectional view through the mixing portion of the apparatus.

Referring now to the drawings in detail the letter A designates a portion of a building upon an upper floor of which is shown a mason to whom plastering material is being supplied by a conveying apparatus B constructed in accordance with the invention.

The apparatus B includes an open top receptacle 10 above which is arranged a mixing cylinder 11 mounted on supports 12 detachably connected with the sides of the receptacle 10. The cylinder 11 is provided adjacent one end with a hopper 13 and has extending longitudinally thereof a combined mixing and conveying screw 14 the rotation of which may be accomplished by connecting a band wheel 15 at one end of the conveyer with a suitable source of motive power. The coupling 16 is provided with a branch 17 which is of rectangular shape in cross section and has mounted therein a spring controlled material operated valve 18. The valve 18 is adapted to normally prevent the material which has entered the coupling 16 escaping through the branch 17 and comprises a plate which extends diagonally of the branch 17 and is pivotally connected at one end with the branch 17. The opposite end of the plate is pivotally connected with a stem 19 which extends exteriorly of the branch 17 through an opening thereon. The extending portion of the stem 19 is passed through a coil expansion spring 20 which normally serves to hold the plate in position to obstruct the passage through the branch 17 and is engaged by a nut 21 adjustably mounted on the stem 19 whereby the pressure required to operate the valve 18 may be regulated.

Detachably connected with the coupling 16 is a pipe 22 which is adapted to extend within the structure A and may be connected with the walls thereof by hooks or other convenient means.

The pipe 22 passes adjacent its discharge end through clamps 23 which are fixed to one of the arms of a substantially U-shaped resilient attaching plate 24 by means of which the discharge end of the pipe 22 may be attached to the shoulder of a mason as shown in Fig. 1 of the drawing.

Detachably connected with the discharge end of the pipe 22 is a nozzle 25 in which is mounted a spring controlled valve 26 which normally prevents the escape of the material within the pipe 22 through the nozzle 25. Connected with the valve 26 is an operating cord 27 which is passed through an eye on the plate 24, so that the cord 27 can be conveniently reached with the left hand of the mason for the operation of the valve 26 to permit the material within the pipe 22 to be discharged upon an implement for spreading the material upon a surface to which it is to be applied.

After the desired quantity of material has been deposited upon the spreading implement held in the right hand of the mason, the valve 26 is allowed to automatically close, so that the material which is being forced from the cylinder 11 into the coupling 16 will automatically open the valve 18 and pass through an overflow pipe 27 connected with the branch 17 and adapted to discharge either into the hopper 13 or into the receptacle 10.

When the valve 26 is again opened upon pressure by the material within the coupling 16 pressure upon the valve 18 is relieved to such an extent that the valve 18 is automatically operated by the spring 20 to cut off the flow of material through the pipe 27 until valve 26 is again closed.

From the foregoing description taken in connection with the accompanying drawings it is apparent that a simple and inexpensive conveying apparatus has been provided which is highly efficient for the purposes stated.

While the invention is shown and described for use upon the interior of buildings, it is obvious that it is equally well adapted for other uses, as for example in conveying material such as brick, mortar to the walls of the buildings under construction, replacing other means commonly used for this purpose.

Having thus described the invention what is claimed as new, is:

1. A device of the class described comprising a mixing chamber, a continuously operated combined mixing and feeding element located therein, a valve controlled delivery pipe communicating with the interior of the mixing chamber, a branch discharge pipe communicating with the delivery pipe and a pressure regulated valve located in the branch discharge pipe.

2. A device of the class described comprising a mixing chamber, a continuously operated combined mixing and feeding element located therein, a valve controlled delivery pipe communicating with the interior of the mixing chamber, a branch discharge pipe communicating with the delivery pipe and a spring controlled diagonally extending valve located in the branch discharge pipe.

3. A device of the class described comprising a mixing chamber, a continuously operated combined mixing and feeding element located therein, a valve controlled delivery pipe connected with the interior of the mixing chamber, a branch discharge pipe communicating with the delivery pipe, a pressure regulated valve located in the branch discharge pipe and a receptacle located at the discharge end of the branch discharge pipe for receiving the excess of material from this pipe.

In testimony whereof I affix my signature.

JOHN MONTGOMERY TAGGART.